(12) United States Patent
Udeshi et al.

(10) Patent No.: US 7,272,608 B2
(45) Date of Patent: Sep. 18, 2007

(54) ISOSURFACE EXTRACTION INTO SPLAT HIERARCHY

(75) Inventors: Tushar Udeshi, Plano, TX (US); Eric Parker, Heath, TX (US)

(73) Assignee: Zyvex Labs, LLC, Richardson, TX (US)

( * ) Notice: Subject to any disclaimer, the term of this patent is extended or adjusted under 35 U.S.C. 154(b) by 513 days.

(21) Appl. No.: 10/749,256

(22) Filed: Dec. 31, 2003

(65) Prior Publication Data

US 2004/0162839 A1 Aug. 19, 2004

Related U.S. Application Data

(63) Continuation-in-part of application No. 10/698,178, filed on Oct. 31, 2003, and a continuation-in-part of application No. 10/306,464, filed on Nov. 27, 2002.

(51) Int. Cl.
*G06F 7/00* (2006.01)
*G06F 12/00* (2006.01)
*G06F 17/30* (2006.01)

(52) U.S. Cl. .......................................... 707/100; 707/200
(58) Field of Classification Search ................ 707/100, 707/200
See application file for complete search history.

(56) References Cited

U.S. PATENT DOCUMENTS

| | | | |
|---|---|---|---|
| 4,202,046 A | 5/1980 | Ward | |
| 5,469,366 A | 11/1995 | Yang et al. | |
| 6,279,007 B1 * | 8/2001 | Uppala | 707/101 |
| 6,539,519 B1 | 3/2003 | Meeker | |
| 6,597,359 B1 | 7/2003 | Lathrop | |
| 6,865,509 B1 | 3/2005 | Hsiung et al. | |
| 6,986,739 B2 | 1/2006 | Warren et al. | |
| 2001/0044327 A1 | 11/2001 | Kanefsky | |
| 2002/0027563 A1 | 3/2002 | Van Doan et al. | |
| 2002/0138353 A1 | 9/2002 | Schreiber et al. | |
| 2003/0137539 A1 | 7/2003 | Dees | |
| 2003/0187867 A1 | 10/2003 | Smartt | |

(Continued)

OTHER PUBLICATIONS

Wilhelms et al. Octrees for Faster Isosurface Generation, Jul. 1992, ACM Press, vol. 22, Issue 3, pp. 201-227.*

(Continued)

*Primary Examiner*—Don Wong
*Assistant Examiner*—Helene Rose
(74) *Attorney, Agent, or Firm*—Haynes and Boone, LLP (57) ABSTRACT

A method of extracting isosurface data from hierarchical node data, including providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes. The method also includes determining a plurality of leaf node splats each corresponding to one of the plurality of leaf nodes that includes a portion of an isosurface, wherein each of the plurality of leaf node splats is based on scalar data corresponding to at least one of the plurality of leaf nodes. A plurality of non-leaf node splats each corresponding to one of the plurality of non-leaf nodes that includes a portion of the isosurface is also determined, wherein each of the plurality of non-leaf node splats is based on a plurality of splats each corresponding to a lower hierarchical node.

51 Claims, 3 Drawing Sheets

U.S. PATENT DOCUMENTS

2003/0212725 A1 11/2003 Ovshinsky et al.
2004/0205093 A1 10/2004 Li et al.

OTHER PUBLICATIONS

Chang et al. LDI: a hierarchical representation for image-based rendering, May 1999, ACM Special Interest Group on Computer Graphics and Interactive, pp. 291-298.*

Co et al., "Iso-Splatting: A Point Based Alternative to Isosurface Visualization", Proceedings of the 11$^{th}$ Pacific Conference on Computer Graphics and Applications (PG'03), IEEE 2003.

International Search Report from PCT Application No. PCT/US2004/043833, May 2005.

Rusinkiewicz et al., "Qsplat: A Multiresolution Point Rendering System for Large Meshes", Computer Graphcis Proceedings, Annual Conference Series 2000, pp. 343-352.

Written Opinion of the International Searching Authority from PCT Application No. PCT/US2004/043833, May 2005.

E. Parker, et al., "Exploiting Self-Similarity in Geometry for Voxel Based Solid Modeling", Eight ACM Symposium on Solid Modeling and Applications SM'03, Jun. 16-20, 2003, Seattle, Washington.

E. Parker, et al., "MEMULATOR: A Fast and Accurate Geometric Modeling, Visualization and Mesh Generation for 3D MEMS Design and Simulation", Nonotech 2003 Vol. 2, Technical Proceedings of the 2003 Nanotechnology Conference and Trade Show.

T. Udeshi, "Tetrahedral Mesh Generation From Segmented Voxel Data", 12$^{th}$ International Meshing Roundtable, Sep. 14-17, 2003.

Hinze, "Memo Functions, Polytypically!", Institut fur Informatik III, University Bonn, Bonn Germany, Jul. 2000.

Tiankai et al., "The Etree Library: A System for Manipulating Large Octrees on Disk", School of Computer Science, Pittsburgh, PA Jul. 2003.

Popinet, "Gerris: a Tree-Based Adaptive Solver for the Incompressible Euler Equations in Complex Geometries", Journal of Computational Physics Academic Press USA, vol. 190, No. 2, Sep. 2003.

International Search Report from PCT Application No. PCT/US2004/035625, Mar. 2005.

Written Opinion for the International Searching Authority from PCT Application No. PCT/US2004/035625, Mar. 2005.

* cited by examiner

ISOSURFACE EXTRACTION INTO SPLAT HIERARCHY

CROSS-REFERENCE

This application is a continuation-in-part of U.S. patent application Ser. No. 10/306,464 entitled "EFFICIENT DATA STRUCTURE" filed on Nov. 27, 2002, which is hereby incorporated by reference in its entirety.

This application is also a continuation-in-part of U.S. patent application Ser. No. 10/698,178 entitled "SYSTEM AND METHOD FOR PROCESSING A HIERARCHICAL DATA TREE" filed on Oct. 31, 2003, which is hereby incorporated by reference in its entirety.

This invention was made with the United States Government support under 70NANB1H3021 awarded by the National Institute of Standards and Technology (NIST). The United States Government has certain rights in the invention.

BACKGROUND

The present disclosure relates generally to solid model data manipulation and visualization and, more specifically, to systems and methods for extracting isosurfaces into a splat hierarchy.

Visualization (or point rendering) of workpieces is a necessary function of computer aided solid modeling. Conventionally, visualization includes converting solid or volume data to triangular or other polygonal mesh data. For example, the "marching cubes" algorithm subdivides volume data into a series of small cubes, such that the corner points of the cubes may be examined and an appropriate set of polygons may be generated to replace the cubes based on the examination of the corner points. However, such a process is time-extensive and consumes a substantial amount of computing resources.

Another rendering process utilizes a splat hierarchy. A splat is a computer-generated disk having a radius, center and normal unit vector, such that solid model surfaces may be collectively represented by a large number of splats corresponding to points on or portions of the surfaces. Typically, rendering utilizing such splats employs triangular mesh data as an input, requiring solid volume data (e.g., voxel data) or non-triangular mesh data to be converted to triangular mesh data before splat generation. While providing some improvement over the marching cubes algorithm and other previous rendering techniques, the conversion of the mesh data into a splat hierarchy also requires substantial computing resources.

Accordingly, what is needed in the art is a system and method that addresses the above-discussed issues.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
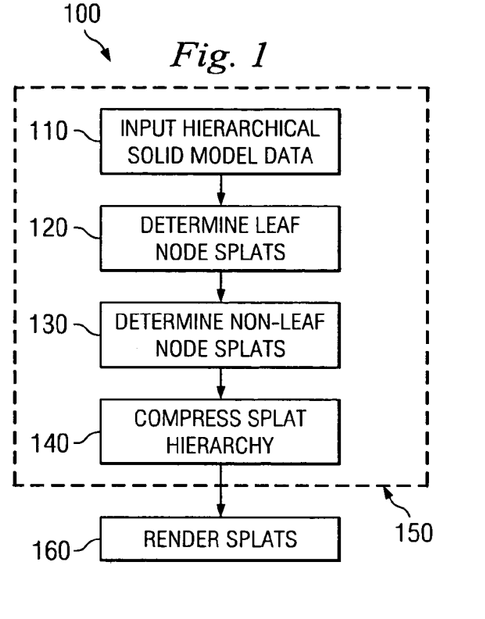
FIG. 1 illustrates a flow chart diagram of one embodiment of a method of visually rendering voxel data according to aspects of the present disclosure.

Referring to FIG. 1, illustrated is a flow chart diagram of one embodiment of a method 100 of visually rendering voxel data according to aspects of the present disclosure. The method 100 includes a step 110 in which hierarchical solid model data to be visualized is provided. However, aspects of the present disclosure are also applicable and/or readily adaptable to 2-dimensional data. Thus, although aspects disclosed herein may be discussed with respect to 3-dimensional data, such description does not limit the scope of the present disclosure or individual aspects thereof to 3-dimensional applications. Similarly, aspects disclosed herein with respect to 2-dimensional data does not limit the scope of the present disclosure or individual aspects thereof to 2-dimensional applications.

The hierarchical solid model data input in step 110 may be in octree format having a root node, 8 nodes in a next lower hierarchy, 64 nodes in a next lower hierarchy, etc. The nodes at the lowest hierarchy level may be referred to as leaf nodes, whereas the nodes in all other hierarchy levels may be referred to as non-leaf nodes. Each of the non-leaf nodes encompasses one or more leaf nodes. For example, a non-leaf node in the lowest non-leaf node hierarchy level may encompass 8 leaf nodes. The octree format may also be a DAG octree, or a shared octree.

The solid model represented by the hierarchical data input in step 110 may include an isosurface. In one embodiment, an isosurface is analogous to an isocontour (or contour line) in 2-dimensional data or models. For example, an isosurface may be formed by connecting all points in a scalar field having the same scalar value. Aspects of the present disclosure are also applicable and/or readily adaptable to extracting surfaces other than or in addition to isosurfaces.

The method 100 also includes a step 120 in which leaf node splats each corresponding to one of the leaf nodes are determined. Step 120 may include determining a leaf node splat for each of the leaf nodes in the hierarchical data provided in step 110, or a subset thereof. Each of the leaf node splats is based on scalar values corresponding to at least one of the leaf nodes. For example, the leaf node splats may be based on material occupancy data corresponding to one or more leaf nodes, as in an embodiment discussed further below. Of course, scalar values representing other characteristics of the leaf nodes may also be employed within the scope of the present disclosure to generate the leaf node splats.

The method 100 also includes a step 130 in which non-leaf node splats each corresponding to one of the plurality of non-leaf nodes are determined. Step 130 may include determining a non-leaf node splat for each of the non-leaf nodes in the hierarchical data provided in step 110, or a subset thereof. Each of the plurality of non-leaf node splats are based on a plurality of splats each corresponding to a lower hierarchical node. For example, the splats in the lowest hierarchical level of non-leaf node splats are each based on a plurality of leaf-node splats, and the splats in the lowest hierarchical level of non-leaf node splats are also employed to determine the splats at the next higher hierarchical level of non-leaf node splats. One example of such a dependence of the non-leaf node splats on lower hierarchy splats will be discussed further below. Thus, the leaf node splats and non-leaf node splats may collectively form a splat hierarchy, such as a splat octree or other tree structure, which may be in shared or DAG format.

The leaf node splats and non-leaf node splats, collectively or separately, represent the isosurface. That is, at least a subset of the leaf node splats and/or the non-leaf node splats approximate or, in the aggregate, are substantially similar or identical to the isosurface. Thus, the "representation" of the isosurface by ones of the leaf node splats and/or the non-leaf node splats is intended to include approximation of the isosurface and also substantially similar or identical representations of the isosurface. In one embodiment, the representation of the isosurface by the leaf node splats and/or non-leaf node splats may be skewed, shifted or substantially uniformly displaced from the original location of the isosurface within the hierarchical data provided in step 110. For example, the isosurface may be displaced by a distance equal to a fraction of a dimension of the leaf nodes in the hierarchical data provided in step 110.

Each of the leaf node splats and non-leaf node splats determined in steps 120 and 130 may be determined employing recursive processes, such as in top-down techniques. For example, to determine a higher hierarchy non-leaf node splat that does not yet exist, the focus of analysis may initiate at the non-leaf node corresponding to the as-yet non-existent non-leaf node splat, and subsequently traverse the branches of children nodes therein until lower hierarchy splats are located. The lower hierarchy splats located in this manner may be employed to build-up the splat hierarchy to the non-leaf node at which the analysis started. If no splats are located as the branches of children are traversed down to the leaf nodes, leaf node splats may be created before the analysis traverses back up the branches.

Such recursive analysis may also employ results matching. For example, the generation of leaf-node splats may depend on retrieved data from corresponding leaf-nodes. Particular or repeatedly located retrieved data may be stored in a cache with the corresponding splat generated therefrom such that, upon subsequent retrieval of the repeated data, splat parameters may be read from the cache instead of being recalculated. Similarly, for non-leaf node splat generation, subsets of lower level hierarchy splat parameters and the corresponding higher level splat (or parameters thereof) may be cached such that, upon retrieval of repeated lower level splat parameters, the higher level splat being generated may be read from the cache rather than being regenerated.

The method 100 may also include a step 140 in which the splat hierarchy generated by steps 120 and 130 is compressed. For example, results matching or other methods may be employed to reduce the processing time and/or other requirements of generating, processing, storing and/or rendering the splat hierarchy. In one embodiment, such compression may include merging similarly oriented splats into one larger splat, possibly at a higher hierarchy level. Methods of compressing splat data will be discussed further below.

In addition to being a portion of the method 100 of visually rendering voxel data, steps 110-130 and optionally step 140 may form one embodiment of a method 150 of extracting surface data from voxel data that may be employed for use in methods other than the method 100. That is, the method 150 may be employed for purposes other than visualizing or rendering surfaces existing in solid model data. For example, the method 150 comprising steps 110-130 and optionally step 140 and/or other steps may be employed in computerized tomography (CT) scanning to analyze and/or manipulate data collected during such scanning. Methods other than the method 100 may also be employed with the method 150 to visualize or render data according to aspects of the present disclosure.

The method 100 also includes a step 160 in which a splat is drawn or otherwise rendered for each splat in at least a portion of the splat hierarchy resulting from steps 120 and 130 discussed above. An embodiment of such rendering will be discussed further below. In one embodiment, only the splats visible from a predetermined perspective (e.g., satisfying frustum and/or backface culling conditions) may be rendered in step 160.

Figure 2:
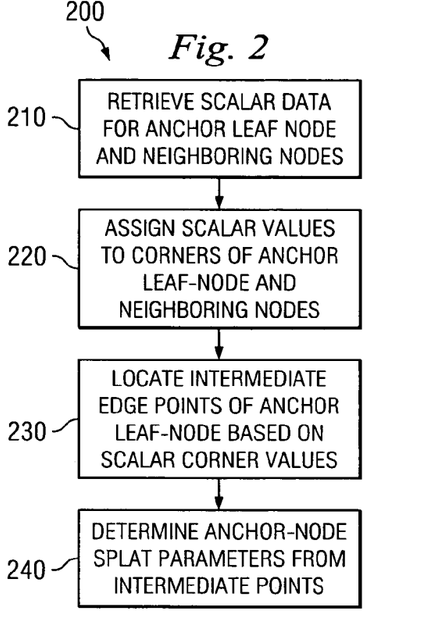
FIG. 2 illustrates a flow chart diagram of one embodiment of a method of determining splats corresponding to leaf nodes according to aspects of the present disclosure.

Referring to FIG. 2, illustrated is a flow chart diagram of one embodiment of a method 200 of determining splats corresponding to leaf nodes according to aspects of the present disclosure. That is, the method 200 determines or generates leaf node splats or data representative thereof. The method 200 is one embodiment of step 120 of the methods 100, 150 shown in FIG. 1.

The method 200 includes a step 210 in which scalar data for an anchor leaf node and one or more neighboring leaf nodes is retrieved. In one embodiment, scalar data may be retrieved for 7 neighboring leaf nodes, such as in embodiments in which the scalar data is retrieved from node data in octree format. The scalar data may represent a common characteristic of the leaf nodes, although possibly of varying values, such as material occupancy percentages of the leaf nodes. For example, in a MEMS or NEMS application embodiment, the scalar data may represent or indicate that the anchor node comprises 80% silicon and that the neighboring nodes comprise various other or similar percentages of silicon.

The method 200 also includes a step 220 in which the retrieved scalar values are assigned to corners of their respective voxels. For example, the value 0.8 may be assigned to the top, right, front corner of the anchor node, and similar values may be assigned to the top, right, front corners of their corresponding voxels. Of course, corners other than the top, right, front corners may additionally or alternatively be employed in step 220, as well as other common points within the voxels, such as voxel center points or voxel edge midpoints. Moreover, the scalar values assigned to each voxel in step 220 may not be identical to the scalar values retrieved in step 210. For example, the assigned scalar values may be the retrieved scalar values after performing rounding, truncating and/or other processes. The assigned scalar values (as well as the retrieved scalar values) may also be quantized to decrease memory storage and processing requirements, such as by representing the assigned scalar values with one byte rather than a floating point number. The assigned values may be temporarily retained for all or a portion of the execution of the methods 100, 150 or 200, or may be more permanently stored for subsequent use.

Figure 3:
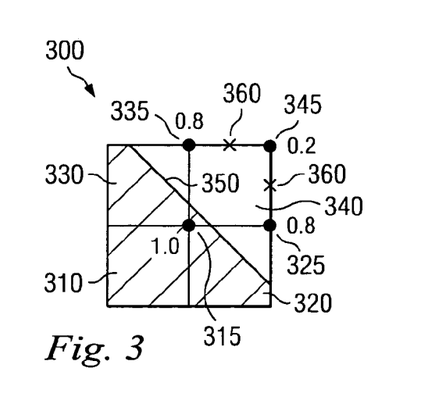
FIG. 3 illustrates a schematic view of an exemplary node for demonstrating one embodiment of the method shown in FIG. 2.

In a step 230, intermediate points on the anchor leaf node edges are determined based on the scalar values assigned in step 220. For example, FIG. 3, illustrates a 2-dimensional non-leaf node 300 encompassing four leaf nodes 310, 320, 330, 340. A surface 350 extends through leaf nodes 320, 330 and 340. The scalar value 1.0 may be assigned to the top right corner 315 of the leaf node 310 because a material substantially occupies the leaf node 310. Similarly, the scalar value 0.8 may be assigned to each of the top right corners 325, 335 of the leaf nodes 320 and 330, respectively, because the leaf nodes 320, 330 are each about 80% occupied by the material, and the scalar value 0.2 may be assigned to the top right corner 345 of the leaf node 340 because the leaf node 340 is about 20% occupied by the material. Intermediate edge points 360 may be determined by finding the location of the intermediate scalar value 0.5 between the scalar values assigned to the corners 325 and 345, and between the scalar values assigned to the corners 335 and 345, possibly by a linear function. Functions other than linear functions may also or alternatively be employed to locate the intermediate edge points 360, including best fit, scalar, quadratic and exponential functions. Moreover, methods other than those described above may be employed to determine the intermediate edge points 360, and may also be employed for additional purposes. In one embodiment, an intermediate scalar value other than 0.5 may be employed, possibly to represent the result of an etching, deposition, skew or shift operation in the resulting leaf node splats.

Returning to FIG. 2, the method 200 also includes a step 240 in which parameters for leaf node splats are determined based on the intermediate edge points determined. In one embodiment, the parameters may include a plane, a center, a radius and/or a normal. Of course, other splat parameters may additionally or alternatively be determined.

The leaf node splat plane (or line, in 2-dimensional applications) may be determined by performing a least square fit of the intermediate edge points, possibly by linear regression. The leaf node splat plane may be offset from the isosurface. For example, as shown in FIG. 3, the intermediate edge points may each be offset from the isosurface. However, because each of the leaf node splat planes extracted according to aspects of the present disclosure are offset by substantially the same distance from the surface(s) of interest, the extracted surfaces will be substantially similar to the surfaces represented in the solid model data.

The leaf node splat normal may be mathematically derived from the function describing the leaf node splat plane. The leaf node splat center may be determined by averaging the locations of the intermediate edge points. The leaf node splat radius may be determined by selecting the smallest radius that completely or substantially divides the leaf node into two portions. Such radius may be measured between the splat center and one of the intermediate edge points. Any or all of the leaf node splat parameters may also be determined recursively, possibly employing results matching, as described above.

Figure 4:
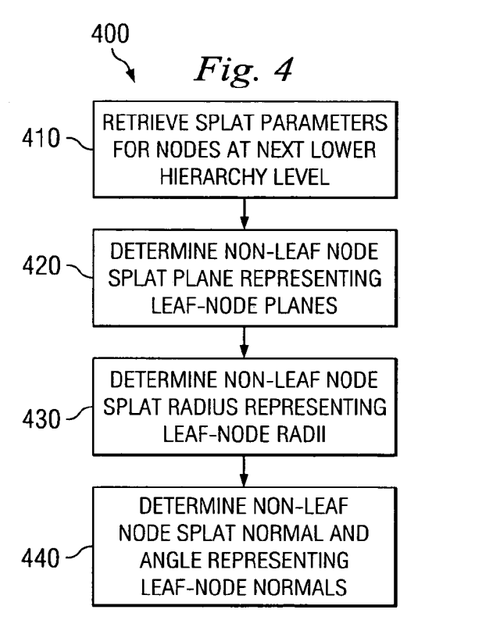
FIG. 4 illustrates a flow chart diagram of one embodiment of a method of determining splats corresponding to non-leaf nodes according to aspects of the present disclosure.

Referring to FIG. 4, illustrated is a flow chart diagram of one embodiment of a method 400 of determining splats corresponding to non-leaf nodes according to aspects of the present disclosure. That is, the method 400 determines or generates non-leaf node splats or data representative thereof. The method 400 is one embodiment of step 130 of the methods 100, 150 shown in FIG. 1.

The method 400 includes a step 410 in which splats and/or splat parameters (e.g., splat centers, normals and radii) are retrieved. Step 410 may include retrieving the splats and/or splat parameters corresponding to each of the nodes in the solid model data being visualized, or a subset thereof. The retrieved splats and/or splat parameters may correspond to leaf nodes and/or non-leaf nodes. In one embodiment, the retrieved splats and/or splat parameters are selected from the next lower hierarchy level relative to the hierarchy level of the splats being determined by the method 400. Moreover, each of the splats and/or splat parameters may be retrieved before execution of other process steps (such that all splats and/or splat parameters are retrieved prior to generating additional splats based thereon), or on an as-needed basis. For example, the step 410 and/or other portions of the method 400 may include recursive processes, such as in embodiments employing DAG or shared octree data or other shared data formats. In such embodiments, only the splats or splat parameters required to create a splat may be retrieved before creating the splat.

The method 400 also includes a step 420 in which a non-leaf node splat plane is determined for one or more non-leaf nodes. The non-leaf node splat plane determined in step 420 (the "parent splat plane") may be based on or dependent on splat planes retrieved in step 410 (the "children splat planes"). For example, each parent splat plane may have a normal that is substantially equal to the average of the normals of the children splat planes. In one embodiment, the average may be a weighted average, possibly weighted in proportion to the radii of the children splats.

In a step 430, a non-leaf node splat radius is determined for one or more non-leaf nodes. The non-leaf node splat radius determined in step 430 (the "parent splat radius") may be based on or dependent on splat radii retrieved in step 410 (the "children splat radii"). In one embodiment, the radius of the parent splat may be the minimum required to completely or substantially separate the corresponding non-leaf node into two portions. For example, the smallest radius that completely or substantially divides the non-leaf node corresponding to the parent splat into two portions may be employed as the parent splat radius.

In a step 440, a non-leaf node splat cone is determined for one or more non-leaf nodes. The non-leaf node splat cone determined in step 440 (the "parent splat cone") may be based on or dependent on splat normals or cones retrieved in step 410 (collectively the "children splat-normals"). For example, the axis of the parent splat cone may be an average (e.g., a children-splat-radius-weighted-average) of the children splat normals, and the cone may be defined by the complete revolution of a unit vector about the axis, the unit vector having an angle relative to the axis that is substantially equal to the greatest angle among the children splat normals relative to the axis. Accordingly, the parent splat cone substantially encompasses each of the children splat normals. The parent splat cone may be stored with the other non-leaf splat parameters. In one embodiment, the cosine or other trigonometric function of the cone angle may be stored rather than or in addition to the cone angle. Moreover, any of the splat parameters may be quantized prior to storing, and the splat parameters may be stored temporarily or more permanently.

Figure 5:
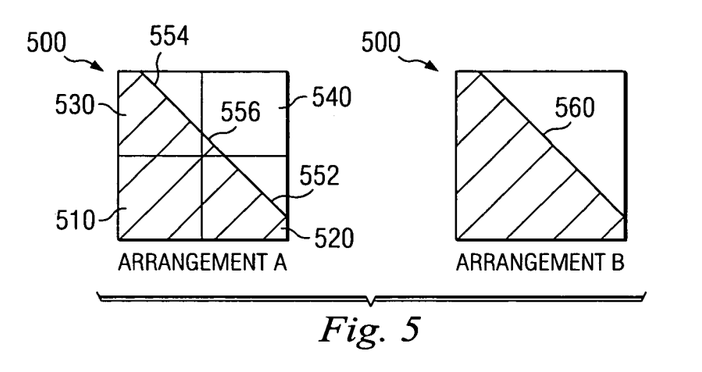
FIGS. 5 and 6 illustrate schematic representations of at least a portion of one embodiment of a method of compressing a splat hierarchy according to aspects of the present disclosure.

Referring to FIG. 5, illustrated is a schematic representation of at least a portion of one embodiment of a method of compressing a splat hierarchy according to aspects of the present disclosure. The splat hierarchy may be one such as a splat hierarchy created by recursively performing the methods 200 and 400 described above. Such a compression method may be referred to as a method of "squeezing" the splat hierarchy. FIG. 5 includes Arrangement A depicting a 2-dimensional node 500 encompassing four lower-hierarchy level nodes 510, 520, 530, 540 and three splats 552, 554, 556 collectively extending through the nodes 520, 530 and 540, respectively. Each of the three splats 552, 554, 556 are substantially aligned, or have substantially similar or identical splat planes. Accordingly, the splats 552, 554, 556 may be combined in a single splat extending through the corresponding nodes 520, 530 and 540. Thus, in one embodiment, the splats 552, 554, 556 may be replaced with a single, higher-hierarchy level splat 560. Thus, FIG. 5 also includes Arrangement B depicting the 2-dimensional node 500 having the splat 560 extending therethrough, such that the splats 552, 554, 556 of the lower hierarchy nodes 520, 530, 540 need not be subsequently referred to and/or stored in memory. The replacement splat 560 is substantially aligned or coplanar with the splats 552, 554, 556, has a radius that is larger than the radius of each of the replaced splats 552, 554, 556, and also has a splat cone substantially encompassing the normals of the replaced splats 552, 554, 556 and any of their children.

Figure 6:
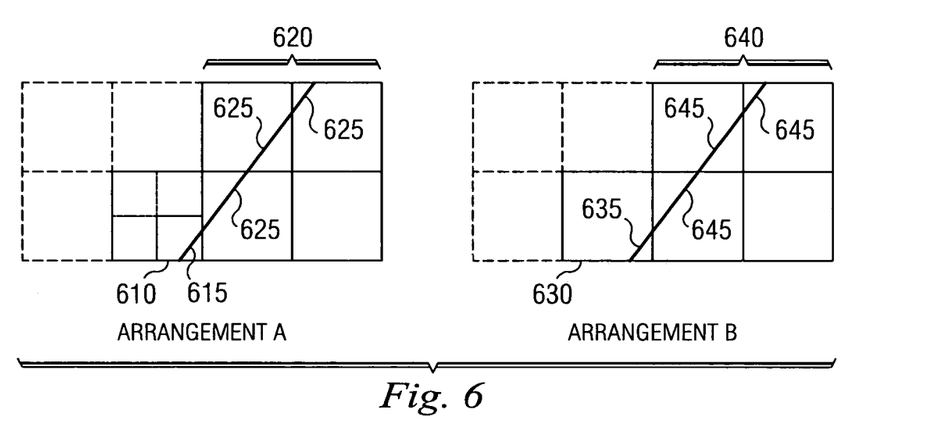

In one embodiment, such combination of substantially aligned planes may be performed only if additional conditions are met. One such condition may be that the neighboring splats may differ by at most one hierarchy level. For example, FIG. 6 illustrates schematic representations (Arrangements A and B) of scenarios demonstrating when such a condition may or may not be satisfied according to one embodiment of splat hierarchy compression according to aspects of the present disclosure.

In Arrangement A, a lower hierarchy node 610 includes a splat 615 that is proximate splats 625 of a neighboring, higher hierarchy level node 620, wherein each of the splats 625 correspond to children nodes of node 620. However, the splat 615 is one hierarchy level lower than the splats 625. Combining the splats 625 into a single splat would result in a larger splat having a hierarchy level that is two hierarchy levels higher than that of the splat 615. Consequently, the combination condition described above is not satisfied, and the splats 625 may not be combined according to the method 500 described above.

In Arrangement B, a lower hierarchy node 630 includes a splat 635 that is proximate splats 645 of a neighboring, higher hierarchy level node 640, wherein each of the splats 645 correspond to children nodes of node 640. However, the splat 635 has the same hierarchy level as the splats 645. Combining the splats 645 into a single splat would result in a larger splat having a hierarchy level that is only one hierarchy level higher than that of the splat 635. Consequently, the combination condition described above is satisfied, and the splats 645 may be combined according to the method 500 described above.

Figure 7:
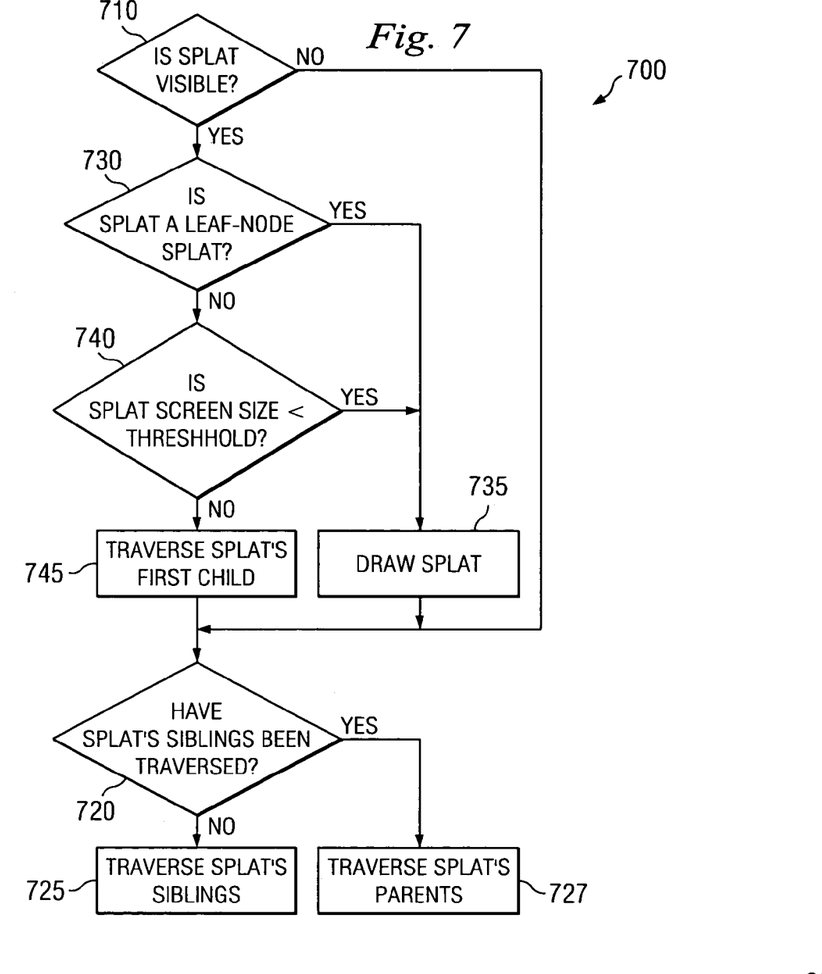
FIG. 7 illustrates a flow chart diagram of one embodiment of a method of rendering at least a portion of a splat hierarchy according to aspects of the present disclosure.

Referring to FIG. 7, illustrated is a flow chart diagram of one embodiment of a method 700 of rendering at least a portion of a splat hierarchy according to aspects of the present disclosure. The method 700 may be performed recursively, and may employ results matching, as described above.

In a decisional step 710, splats are examined to determine if they are visible. Such determination may consider backface culling, in which splats on a side of the solid object that is opposite the rendering view point may not be rendered. The visibility determination may also consider visibility or frustum culling, in which only those splats within a predetermined view angle relative to the rendering view point may be rendered. The visibility determination may also consider detail culling. Splats determined to be not visible in step 710, and possibly all lower hierarchy splats on the same hierarchy branch (splat children), are not rendered.

In a step 720, the non-rendered splats' siblings are examined to determine if they have ever been traversed. Step 720 may include determining if non-rendered splats' siblings have been traversed during a current iteration or a predetermined number of recent iterations of the method 700 (or a portion or variation thereof). The siblings may then be traversed in a step 725. For example, the method 700 or a portion or variation thereof may be repeated for the siblings. As such, the method 700 may be recursive. If the siblings need not be traversed, as determined in step 720, the non-rendered splats' parents may then traversed in a step 727. For example, the method 700 or a portion or variation thereof may be repeated for the splats' parents (again, possibly in a recursive manner).

In a step 730, visible splats are examined to determine status as either a leaf node splat or a non-leaf node splat. Visible leaf node splats are rendered in a step 735, possibly with no other considerations before rendering. In decisional step 720, the drawn splats' siblings are examined to determine if they have ever been traversed or, alternatively, if they have been traversed during a current iteration or a predetermined number of recent iterations of the method 700 (or a portion or variation thereof). The siblings may then be traversed in step 725, or the drawn splats' parents may then be traversed in step 727, as discussed above.

For splats not found to be leaf node splats in step 730, a decisional step 740 compares the screen sizes of visible, non-leaf node splats to a threshold value. Splats having screen sizes less than the threshold are rendered, such as in step 735. The threshold value may be adjusted (e.g., by a user) to maintain a desired frame rate of the rendering. In one embodiment, the frame rate may be increased during periods in which the rendered image is being manipulated (e.g., rotated, translated, etc.) and decreased during time periods in which the rendered image is stationary on the screen. Increasing the frame rate may reduce the resolution of the displayed image, and decreasing the frame rate may increase the resolution of the displayed image.

The first child of splats having screen sizes greater than the threshold are traversed in a step 745, by once again executing the method 700 (or a portion or variation thereof) with the splat child. After traversing the first child of splats having screen sizes greater than the threshold in step 745, the siblings of the first child splats are examined in decisional step 720, such that the siblings or the parents of the first child splats may subsequently be traversed in steps 725, 727, as discussed above. Traversing splat parents may be, or may be similar to, executing a "return" statement in C++ programming language. For example, such a return statement may indicate that a function has ended and that the caller of the function should continue to the next step. Thus, in one embodiment, after traversing child splats in step 745, such a return statement would indicate that step 720 is the next step to be performed.

Figure 8:
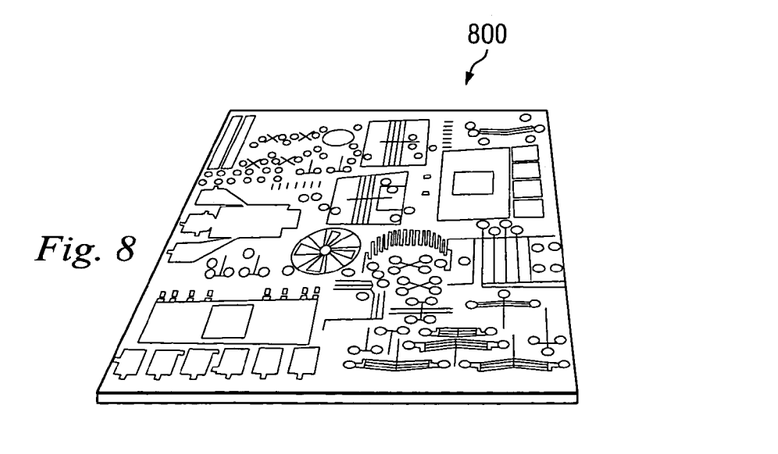
FIG. 8 illustrates a perspective view of one embodiment of a MEMS device rendering according to aspects of the present disclosure.

The methods of isosurface extraction and/or point rendering described above have many applications. Referring to FIG. 8, illustrated is a perspective view of a MEMS device 800 as one example of an application of the method 100 shown in FIG. 1 according to aspects of the present disclosure. The MEMS device 800 may include one or more MEMS bidirectional actuators and/or other MEMS devices within the scope of the present disclosure.

Processing according to aspects of the present disclosure also has a large field of application in the medical field. For example, in modeling irradiation in tumor therapy, magnetic resonance imaging (MRI) or computerized tomography (CT) scan data can be segmented into various entities (e.g., bone, tissue, skin, etc.). These regions can then be processed according to aspects of the present disclosure, such as by the method 100 shown in FIG. 1.

Figure 9:
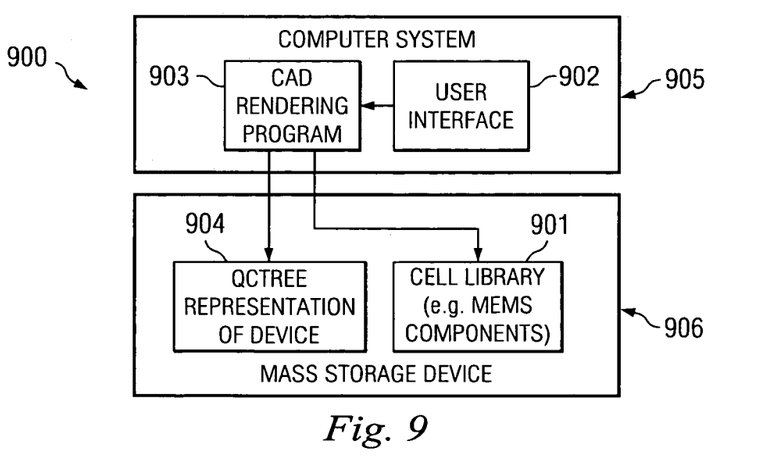
FIG. 9 illustrates a schematic view of one embodiment of a CAD system according to aspects of the present disclosure.

Referring to FIG. 9, illustrated is a schematic view of one embodiment of a computer aided design (CAD) or other processing system 900 constructed according to aspects of the present disclosure. The system 900 may be designed to create engineered objects (e.g., NEMS, MEMS and/or other microelectronic devices) from, in part, standard cell components. Moreover, the system 900 may be configured to extract isosurfaces from solid model data for subsequent rendering or other visualization, among other actions.

The standard cell components may be stored in a library 901 utilizing a mass storage device 906. For example, in a MEMs device design, the cell components may include discrete MEMs elements, such as thermal actuators, electrostatic actuators, micro-grippers, micro-latches, micro-tethers, micro-rotators and/or the like. The standard cell components may define the respective spatial composition of the various discrete elements.

A user interface 902 and a rendering program 903 may be implemented as software processes executable on a computer system 905. In one embodiment, a user may "pick-and-place" discrete cell components utilizing the user interface 902 and, in response, the rendering program 903 may select the respective cell component from the cell library 901. When the user "drops" the discrete cell component at a desired location, the rendering program 903 may locate the respective portions of an octree representation 904 of the device being designed. The rendering algorithm 903 may update the portions of the octree representation 904 to reflect the addition of the cell component. Specifically, the respective elemental level nodes of the octree 904 may be created and/or modified to reflect the material composition(s) of the cell component at the respective locations. For MEMs devices, a binary or non-binary data structure may be employed to identify possible material compositions such as semiconductor materials, oxides, ceramics, metals and/or the like. Such rendering may include performing one or more of the methods described above.

It may follow from the preceding discussion that the visualization or other rendering described above, or portions or aspects thereof, may also be implemented as a program product. Such a program product may be employed with or executed by the system 900 shown in FIG. 9. In one embodiment, the program product includes a computer-readable storage medium and means recorded on the medium for providing hierarchical node data representing an object having an isosurface, the hierarchical node data including a lowest hierarchy level having a plurality of leaf nodes and a plurality of higher hierarchy levels each having a plurality of non-leaf nodes each encompassing ones of the plurality of leaf nodes. The program product also includes means recorded on the medium for determining a plurality of leaf node splats each corresponding to one of the plurality of leaf nodes that includes a portion of an isosurface, wherein each of the plurality of leaf node splats is based on scalar data corresponding to at least one of the plurality of leaf nodes. The program product also includes means recorded on the medium for determining a plurality of non-leaf node splats each corresponding to one of the plurality of non-leaf nodes that includes a portion of the isosurface, each of the plurality of non-leaf node splats based on a plurality of splats each corresponding to a lower hierarchical node.

Another embodiment of a program product according to aspects of the present disclosure also includes means recorded on the medium for rendering a plurality of splats partially populating a splat hierarchy resulting from the determination of the pluralities of leaf node splats and non-leaf node splats. The storage medium may be a magnetic or optical recording medium which is readable by a computer, such as by the system 900 shown in FIG. 9. The storage medium may also be a network distribution medium, such as may be employed for downloading the program product over a wired and/or wireless network.

Thus, in general, the present disclosure provides a method of extracting isosurface data from hierarchical node data, including providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes. The method also includes determining a plurality of leaf node splats each corresponding to one of the plurality of leaf nodes that includes a portion of an isosurface, wherein each of the plurality of leaf node splats is based on scalar data corresponding to at least one of the plurality of leaf nodes. A plurality of non-leaf node splats each corresponding to one of the plurality of non-leaf nodes that includes a portion of the isosurface is also determined, wherein each of the plurality of non-leaf node splats is based on a plurality of splats each corresponding to a lower hierarchical node.

The present disclosure also introduces a method of rendering isosurface data. In one embodiment, the method includes providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes. The method also includes determining a plurality of leaf node splats each corresponding to one of the plurality of leaf nodes that includes a portion of an isosurface, wherein each of the plurality of leaf node splats is based on scalar data corresponding to at least one of the plurality of leaf nodes. A plurality of non-leaf node splats each corresponding to one of the plurality of non-leaf nodes that includes a portion of the isosurface is also determined, wherein each of the plurality of non-leaf node splats is based on a plurality of splats each corresponding to a lower hierarchical node. A plurality of splats partially populating a splat hierarchy resulting from the determination of the pluralities of leaf node splats and non-leaf node splats may then be rendered.

A processing system for extracting isosurface data from hierarchical node data is also provided in the present disclosure. In one embodiment, the processing system includes means for providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes. The processing system also includes means for determining a plurality of leaf node splats each corresponding to one of the plurality of leaf nodes that includes a portion of an isosurface, wherein each of the plurality of leaf node splats is based on scalar data corresponding to at least one of the plurality of leaf nodes. Means for determining a plurality of non-leaf node splats each corresponding to one of the plurality of non-leaf nodes that includes a portion of the isosurface is also included in the processing system, wherein each of the plurality of non-leaf node splats is based on a plurality of splats each corresponding to a lower hierarchical node.

A processing system for rendering isosurface data is also introduced in the present disclosure. In one embodiment, the processing system includes means for providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes. The processing system also includes means for determining a plurality of leaf node splats each corresponding to one of the plurality of leaf nodes that includes a portion of an isosurface, wherein each of the plurality of leaf node splats is based on scalar data corresponding to at least one of the plurality of leaf nodes. Means for determining a plurality of non-leaf node splats each corresponding to one of the plurality of non-leaf nodes that includes a portion of the isosurface is also included in the processing system, wherein each of the plurality of non-leaf node splats is based on a plurality of splats each corresponding to a lower hierarchical node. The processing system also includes means for rendering a plurality of splats partially populating a splat hierarchy resulting from the determination of the pluralities of leaf node splats and non-leaf node splats.

A program product is also provided in the present disclosure. In one embodiment, the program product includes a computer-readable storage medium and means recorded on the medium for providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes. The program product also includes means recorded on the medium for determining a plurality of leaf node splats each corresponding to one of the plurality of leaf nodes that includes a portion of an isosurface, wherein each of the plurality of leaf node splats is based on scalar data corresponding to at least one of the plurality of leaf nodes. Means are also recorded on the medium for determining a plurality of non-leaf node splats each corresponding to one of the plurality of non-leaf nodes that includes a portion of the isosurface, wherein each of the plurality of non-leaf node splats is based on a plurality of splats each corresponding to a lower hierarchical node.

Another embodiment of the program product also includes means recorded on the medium for rendering a plurality of splats partially populating a splat hierarchy resulting from the determination of the pluralities of leaf node splats and non-leaf node splats. The storage medium may be a magnetic or optical recording medium, and may also be a network distribution medium.

A method of extracting isosurface data from a scalar field is also provided in the present disclosure. In one embodiment, the method includes providing scalar field data and building a splat hierarchy. Building the splat hierarchy includes determining a plurality of leaf node splats each corresponding to one of the plurality of leaf nodes that includes a portion of an isosurface, wherein each of the plurality of leaf node splats is based on scalar data corresponding to at least one of the plurality of leaf nodes. Building the splat hierarchy also includes determining a plurality of non-leaf node splats each based on a plurality of lower hierarchical splats.

The foregoing has outlined features of several embodiments so that those skilled in the art may better understand the detailed description that follows. Those skilled in the art should appreciate that they can readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they can make various changes, substitutions and alterations herein without departing from the spirit and scope of the present disclosure.

What is claimed is:

1. A method of extracting isosurface data from hierarchical node data, comprising:
   providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes; and
   building a splat hierarchy from the hierarchical node data without converting the hierarchical node data into mesh data, wherein building the splat hierarchy comprises:
   determining a plurality of leaf node splats each corresponding to one of the plurality of leaf nodes that includes a portion of an isosurface, each of the plurality of leaf node splats based on scalar data corresponding to at least one of the plurality of leaf nodes; and
   determining a plurality of non-leaf node splats each corresponding to one of the plurality of non-leaf nodes that includes a portion of the isosurface, each of the plurality of non-leaf node splats based on a plurality of splats each corresponding to a lower hierarchical node.

2. The method of claim 1 wherein the hierarchical node data is 2-dimensional.

3. The method of claim 1 wherein the hierarchical node data is 3-dimensional.

4. The method of claim 1 wherein the hierarchical node data is in octree format.

5. The method of claim 1 wherein the hierarchical node data is in shared octree format.

6. The method of claim 1 wherein at least one of the pluralities of leaf node splats and non-leaf node splats are determined recursively.

7. The method of claim 6 wherein at least one of the pluralities of leaf node splats and non-leaf node splats are determined employing results matching.

8. The method of claim 1 wherein the scalar data is representative of leaf node material occupancy percentages.

9. The method of claim 1 wherein determining the plurality of leaf node splats includes approximating isosurface locations within at least one of the leaf nodes based on the scalar values.

10. The method of claim 9 wherein ones of the plurality of leaf node splats are each partially defined by a leaf node splat center that is an average of intermediate edge point locations, wherein the intermediate edge points approximate a predetermined scalar value along an intersection between the isosurface and leaf node faces.

11. The method of claim 9 wherein ones of the plurality of leaf node splats are each partially defined by a leaf node splat normal that approximates an isosurface normal.

12. The method of claim 9 wherein ones of the plurality of leaf node splats are each partially defined by a radius determined such that each of the of leaf node splats divides each corresponding leaf node into two portions.

13. The method of claim 12 wherein the radius of each of the plurality of leaf node splats is the minimum radius that permits the corresponding leaf node splat to divide the corresponding leaf node into two portions.

14. The method of claim 1 wherein each of the plurality of non-leaf node splats is partially defined by a plane based on a least square fit of a plurality of lower hierarchical splats.

15. The method of claim 1 wherein each of the plurality of non-leaf nodes splats is partially defined by a radius determined such that each of the of non-leaf node splats divides each corresponding non-leaf node into two portions.

16. The method of claim 15 wherein the radius of each of the plurality of non-leaf node splats is the minimum radius that permits the corresponding non-leaf node splat to divide the corresponding non-leaf node into two portions.

17. The method of claim 1 wherein each of the plurality of non-leaf node splats is partially defined by a normal and a cone encompassing a plurality of lower hierarchy splat normals.

18. The method of claim 1 further comprising compressing a splat hierarchy populated by the pluralities of leaf node splats and non-leaf node splats.

19. The method of claim 18 wherein compressing includes replacing a plurality of substantially coplanar lower hierarchy splats with a combine splat substantially coplanar with the plurality of lower hierarchy splats, having a radius larger than the individual radii of the plurality of lower hierarchy splats, and having a splat cone substantially encompassing a plurality of children splat normals.

20. A method of rendering isosurface data, comprising:
providing hierarchical node data representing an object having an isosurface, the hierarchical node data including a lowest hierarchy level having a plurality of leaf nodes and a plurality of higher hierarchy levels each having a plurality of non-leaf nodes each encompassing ones of the plurality of leaf nodes;
building a splat hierarchy from the hierarchical node data without converting the hierarchical node data into mesh data, wherein building the splat hierarchy comprises:
determining a plurality of leaf node splats each corresponding to one of the plurality of leaf nodes that includes a portion of an isosurface, each of the plurality of leaf node splats based on scalar data corresponding to at least one of the plurality of leaf nodes; and
determining a plurality of non-leaf node splats each corresponding to one of the plurality of non-leaf nodes that includes a portion of the isosurface, each of the plurality of non-leaf node splats based on a plurality of splats each corresponding to a lower hierarchical node; and
rendering a plurality of splats partially populating the splat hierarchy resulting from the determination of the pluralities of leaf node splats and non-leaf node splats.

21. The method of claim 20 wherein the plurality of rendered splats satisfy visibility conditions, wherein the splat hierarchy also includes a plurality of non-rendered splats.

22. The method of claim 21 wherein one of the visibility conditions is backface culling.

23. The method of claim 21 wherein one of the visibility conditions is viewpoint frustum culling.

24. The method of claim 21 wherein one of the visibility conditions compares splat screen sizes to threshold values.

25. The method of claim 20 wherein the rendering is performed recursively.

26. A processing system for extracting isosurface data from hierarchical node data, comprising:
means for providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes; and
means for building a splat hierarchy from the hierarchical node data without converting the hierarchical node data into mesh data, wherein the means for building the splat hierarchy comprises:
means for determining a plurality of leaf node splats each corresponding to one of the plurality of leaf nodes that includes a portion of an isosurface, each of the plurality of leaf node splats based on scalar data corresponding to at least one of the plurality of leaf nodes; and
means for determining a plurality of non-leaf node splats each corresponding to one of the plurality of non-leaf nodes that includes a portion of the isosurface, each of the plurality of non-leaf node splats based on a plurality of splats each corresponding to a lower hierarchical node.

27. The system of claim 26 wherein at least one of the means for determining the pluralities of leaf node splats and non-leaf node splats includes means for recursive determination.

28. The system of claim 27 wherein the recursive determination means is configured to employ results matching.

29. The system of claim 26 wherein the scalar data is representative of leaf node material occupancy percentages.

30. A processing system for rendering isosurface data, comprising:
means for providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes;
means for building a splat hierarchy from the hierarchical node data without converting the hierarchical node data into mesh data, wherein the means for building the splat hierarchy comprises:
means for determining a plurality of leaf node splats each corresponding to one of the plurality of leaf nodes that includes a portion of an isosurface, each of the plurality of leaf node splats based on scalar data corresponding to at least one of the plurality of leaf nodes; and
means for determining a plurality of non-leaf node splats each corresponding to one of the plurality of non-leaf nodes that includes a portion of the isosurface, each of the plurality of non-leaf node splats based on a plurality of splats each corresponding to a lower hierarchical node; and means for rendering a plurality of splats partially populating the splat hierarchy.

31. The system of claim 30 wherein the means for rendering the plurality of splats includes means for verifying that ones of the plurality of splats satisfy visibility conditions, wherein the splat hierarchy also includes a plurality of non-rendered splats.

32. The system of claim 31 wherein one of the visibility conditions is backface culling.

33. The system of claim 31 wherein one of the visibility conditions is viewpoint frustum culling.

34. The system of claim 31 wherein one of the visibility conditions compares splat screen sizes to threshold values.

35. The system of claim 30 wherein the rendering means includes means for performing rendering recursively.

36. A program product, comprising:

a computer-readable storage medium;

means recorded on the medium for providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes; and means recorded on the medium for building a splat hierarchy from the hierarchical node data without converting the hierarchical node data into mesh data, wherein the means for building the splat hierarchy comprises:

means recorded on the medium for determining a plurality of leaf node splats each corresponding to one of the plurality of leaf nodes that includes a portion of an isosurface, each of the plurality of leaf node splats based on scalar data corresponding to at least one of the plurality of leaf nodes; and means recorded on the medium for determining a plurality of non-leaf node splats each corresponding to one of the plurality of non-leaf nodes that includes a portion of the isosurface, each of the plurality of non-leaf node splats based on a plurality of splats each corresponding to a lower hierarchical node.

37. The program product of claim 36 wherein at least one of the means for determining the pluralities of leaf node splats and non-leaf node splats includes means recorded on the medium for recursive determination.

38. The program product of claim 37 wherein the recursive determination means is configured to employ results matching.

39. The program product of claim 36 wherein the storage medium is a magnetic recording medium.

40. The program product of claim 36 wherein the storage medium is an optical recording medium.

41. The program product of claim 36 wherein the storage medium is a network distribution medium.

42. A program product, comprising:

a computer-readable storage medium;

means recorded on the medium for providing hierarchical node data representing an object, the hierarchical node data including a lowest hierarchy level having a plurality of leaf nodes and a plurality of higher hierarchy levels each having a plurality of non-leaf nodes each encompassing ones of the plurality of leaf nodes;

means recorded on the medium for building a splat hierarchy from the hierarchical node data without converting the hierarchical node data into mesh data, wherein the means for building the splat hierarchy comprises:

means recorded on the medium for determining a plurality of leaf node splats each corresponding to one of the plurality of leaf nodes that includes a portion of an isosurface, each of the plurality of leaf node splats based on scalar data corresponding to at least one of the plurality of leaf nodes; and means recorded on the medium for determining a plurality of non-leaf node splats each corresponding to one of the plurality of non-leaf nodes that includes a portion of the isosurface, each of the plurality of non-leaf node splats based on a plurality of splats each corresponding to a lower hierarchical node; and means recorded on the medium for rendering a plurality of splats partially populating the splat hierarchy.

43. The program product of claim 42 wherein the means for rendering the plurality of splats includes means for verifying that ones of the plurality of splats satisfy visibility conditions, wherein the splat hierarchy also includes a plurality of non-rendered splats.

44. The program product of claim 43 wherein one of the visibility conditions is backface culling.

45. The program product of claim 43 wherein one of the visibility conditions is viewpoint frustum culling.

46. The program product of claim 43 wherein one of the visibility conditions compares splat screen sizes to threshold values.

47. The program product of claim 42 wherein the rendering means includes means for performing rendering recursively.

48. The program product of claim 42 wherein the storage medium is a magnetic recording medium.

49. The program product of claim 42 wherein the storage medium is an optical recording medium.

50. The program product of claim 42 wherein the storage medium is a network distribution medium.

51. A method of extracting isosurface data from a scalar field, comprising:

providing scalar field data; and building a splat hierarchy from the scalar field data without converting the scalar field data into mesh data, including:

determining a plurality of leaf node splats each corresponding to one of the plurality of leaf nodes that includes a portion of an isosurface, each of the plurality of leaf node splats based on scalar data corresponding to at least one of the plurality of leaf nodes; and determining a plurality of non-leaf node splats each based on a plurality of lower hierarchical splats.

* * * * *